United States Patent
Han

(10) Patent No.: US 6,537,490 B2
(45) Date of Patent: Mar. 25, 2003

(54) AIR INLET AND OUTLET SILENCER STRUCTURES FOR TURBINE

(75) Inventor: Ming Hui Han, Mississauga (CA)

(73) Assignee: M & I Heat Transfer Products Ltd., Mississauga (CA)

( * ) Notice: Subject to any disclaimer, the term of this patent is extended or adjusted under 35 U.S.C. 154(b) by 0 days.

(21) Appl. No.: 09/867,982

(22) Filed: May 30, 2001

(65) Prior Publication Data

US 2002/0182061 A1 Dec. 5, 2002

(51) Int. Cl.[7] .............................................. F01D 25/04
(52) U.S. Cl. ...................................... 419/119; 181/224
(58) Field of Search ........................ 415/119; 181/224, 181/225, 229, 218, 217

(56) References Cited

U.S. PATENT DOCUMENTS

| | | |
|---|---|---|
| 2,916,101 A | 12/1959 | Naman |
| 2,994,401 A | 8/1961 | Bourne et al. |
| 3,511,336 A | 5/1970 | Rink et al. |
| 5,168,699 A * | 12/1992 | McCarty et al. ............ 60/39.06 |
| 5,728,979 A | 3/1998 | Yazici et al. |
| 6,049,615 A * | 4/2000 | Chou et al. ................. 381/71.3 |

* cited by examiner

Primary Examiner—Edward K. Look
Assistant Examiner—James M McAleenan
(74) Attorney, Agent, or Firm—Young & Basile P.C.

(57) ABSTRACT

Both air duct inlet silencers and air duct outlet silencers for use with a stationary gas turbine are disclosed. The inlet silencer comprises a vertically extending duct structure having an upper section with a plurality of vertically extending sides and a top cover. Air inlet openings are formed in the vertically extending sides and an air outlet is formed at the bottom end for connection to the air intake housing of the turbine. An elongate, central airflow defining member is substantially cylindrical for a major portion of its length and extends downwardly from the top cover and past the air inlets. This member has a perforated sheet metal exterior and contains sound attenuating material. Airflow passages extend from the inlet openings towards the outlet with each defined by at least one interior wall. Each passageway bends substantially downwardly so that the bottom section extends vertically. The outlet silencer includes first and second series of splitters with each series forming smaller air passageways.

16 Claims, 7 Drawing Sheets

AIR INLET AND OUTLET SILENCER STRUCTURES FOR TURBINE

BACKGROUND OF THE INVENTION

This invention relates both to air duct inlet silencers and to air duct outlet silencers, in particular to silencers designed for use with gas turbines.

Stationary gas turbines for the production of power are well known for use by power producing industries. One difficulty that is encountered with the use of gas turbines is the noise that they can create during their operation. Because of this noise, efforts have been made in the past to provide sound attenuators or sound reducing devices both at the intake of the gas turbine and at the outlet end. However for various reasons problems have been encountered in developing satisfactory inlet silencing units and outlet silencing devices for these gas turbines. One reason for these difficulties is that the flow into and out of stationary gas turbines is often compromised because of spacial constraints and cost factors. Many such systems feature a short plenum box with a vertical inflow into the compressor of the turbine and an axial outflow. In the usual case, inlet silencers are installed ahead of the plenum while the gas turbine outlet is often dumped into a plenum which feeds a vertical exhaust section consisting of some form of silencer and exhaust stack.

Outside of the field of gas turbines, both air duct inlet silencers and air duct outlet silencers have been developed in recent years for use in combination with axial fans providing air to large structures such as office buildings and industrial buildings. For example U.S. Pat. No. 5,587,563 issued Dec. 24, 1996 to Dipti K. R. Datta describes both an air inlet silencer for an axial fan and an air outlet silencer, both of which employ sound attenuating material located behind perforated sheet metal walls. The duct inlet silencer includes an exterior housing that has two principal air inlets located on opposite sides of the housing. The unit also has a single air outlet located at one end of the housing. The two inlets and the outlet are connected by airflow passageways defined by interior walls and these passageways bend 90 degrees from the inlets to the outlet. Sections of the interior walls are made from the aforementioned perforated sheet metal. In one preferred embodiment the passageway from each inlet is divided into four quadrants with upper and lower quadrants separated by a horizontal divider.

With respect to the fan outlet silencer described in the aforementioned U.S. patent, it has a top, bottom, and side walls and between these walls extend first and second series of splitters with the splitters of each series being spaced apart to form smaller air passageways. The splitters of each series are mounted side by side in a row and the splitters of one series are staggered with respect to the splitters of the other series in a direction transverse to the direction of airflow. The sound attenuating material that is used in both the inlet silencer and the outlet silencer for an axial fan as described in this U.S. patent is standard sound attenuating material such as fibreglass bats stuffed between the interior walls and the exterior walls and into the interior of the splitters.

Up to the present time, there has been no suggestion that inlet and outlet silencers of this general type could be used in combination with relatively large, stationary gas turbines. One difficulty with the known outlet silencers designed for use with ordinary axial fans is that they are not able to withstand the high temperatures that exist in the hot air stream emitted by the gas turbine nor are they able to withstand the much higher air velocities which can be as much as 15000 feet/minute and higher.

In the air handling art wherein systems have been developed for providing fresh air and return air to structures using suitable fans, it is known that turning vanes to redirect the direction of the airflow into or out of a fan unit can provide excellent turning performance including uniform airflow with minimum pressure loss. The use of such turning vanes in combination with sound attenuating material has proven to be effective in air supplying and air conditioning applications involving the use of axial fan units. Most of these systems employ conventional acoustic dissipative media such as fibreglass. In many of these recently developed systems the sound absorbing surface comprises a special sandwich construction consisting of a perforated cover sheet, an erosion resistant duct-liner and bulk fibre located behind the duct liner and packed to the proper density. However as far as applicant is aware, this sound attenuating technology has not been used with nor proposed for use with gas turbines such as large, stationary gas turbines used for the production of power.

It is an object of the present invention to provide a novel air duct inlet silencing apparatus for use with a stationary gas turbine, this apparatus having substantial sound reducing capabilities and being reliable and relatively easy to maintain over the life of the inlet silencer.

It is another object of the present invention to provide a novel sound attenuating duct unit suitable for connection to the outlet of a stationary gas turbine, this unit being relatively inexpensive to manufacture while having substantial sound attenuating capabilities.

SUMMARY OF THE INVENTION

According to one aspect of the invention, an air duct inlet silencing apparatus for use with a stationary gas turbine includes an inlet duct structure extending around a first vertical axis and extending vertically along this first axis, the duct structure having an upper duct section with a plurality of vertically extending sides and a top cover. Air inlet openings are formed in at least two of the vertically extending sides and an air outlet is formed at the bottom end of the structure. The air outlet is adapted for connection to an air intake of the gas turbine. There is also an elongate, centrally located, airflow defining member which extends around a vertical primary axis and extends downwardly from the top cover, past the air inlet openings, and along the primary axis. This airflow defining member is formed with a perforated sheet metal exterior and contains sound attenuating material. Airflow passageways extend from the air inlet openings towards the air outlet and each is defined by at least one interior wall mounted in the duct structure. Each airflow passageway bends substantially so that a lower section thereof extends substantially parallel to the vertical first axis. A substantial portion of the at least one interior wall is made of perforated sheet metal and sound attenuating material is contained in the at least one interior wall and is covered by the perforated sheet metal.

In one preferred embodiment of this inlet silencer, the upper duct section has at least four vertically extending sides and the air inlet openings are formed in all of the vertically extending sides. The preferred airflow defining member includes a substantially conical or multi-sided upper section that extends downwardly from the top cover to a substantially cylindrical or multi-sided lower portion thereof.

According to another aspect of the invention, a sound attenuating duct unit suitable for connection to an outlet of a stationary gas turbine includes a housing having a horizontal housing section and a vertical housing section and having sidewalls surrounding a main airflow passageway that extends along a substantial bend. An air inlet is located at one end of the horizontal housing section and is adapted for connection to the outlet of the gas turbine. An air outlet is located at an upper end of the vertical housing section. There are at least first and second series of splitters mounted in the housing with the splitters of each series being spaced apart to form smaller air passageways and being mounted side-by-side in a row. The second series is positioned downstream in the airflow passageway relative to the first series and is staggered relative to the first series in a direction generally transverse to the direction of airflow in the main passageway. The splitters contain sound attenuating material, such as ceramic wool, capable of withstanding airflow temperatures inside the main airflow passageway of at least 500 degrees Celsius. At least a substantial portion of both sidewalls surrounding the main airflow passageway and metal sidewalls forming the splitters are made of perforated sheet metal having a thickness of at least 12 gauge.

In a preferred embodiment of this outlet silencer for a turbine, the sound attenuating material is mineral wool and a perforated sheet metal is made of stainless steel.

According to a still further aspect of the invention, there is provided a combination of a gas turbine for installation and use at a selected stationary site and a sound attenuating duct unit connected to a hot air exhaust outlet of the gas turbine. The duct unit includes a housing having a horizontal housing section and a vertical housing section and having sidewalls surrounding a main airflow passageway that extends along a substantial bend. There is an air inlet located at one end of the horizontal housing section and connected to the exhaust outlet of the gas turbine. An air outlet is located at an upper end of the vertical housing section. The combination also includes at least first and second series of splitters mounted in the housing with the splitters of each series being spaced apart to form smaller air passageways and being mounted side-by-side in a row. The second series is positioned downstream in the airflow passageway relative the first series and is staggered relative to the first series in a direction generally transverse to the direction of airflow in the main passageway. The splitters contain sound attenuating material capable of withstanding airflow temperatures in the main airflow passageway of at least 500 degrees Celsius. Also at least a substantial portion of both the sidewalls surrounding the main airflow passageway and metal sidewalls forming the splitters are made of perforated sheet metal having a thickness of at least 12 gauge.

In a preferred embodiment of this combination each splitter includes a rounded nose portion at a leading edge and this nose portion is made of imperforate stainless steel.

According to still another aspect of the invention, an air duct silencing apparatus for use at an inlet of a stationary gas turbine comprises an inlet duct structure extending dowardly along a vertical first axis having a duct section with a plurality of vertically extending sides and a top cover, a plurality of inlet openings being located on one of the vertically extending sides, which is an open side to a substantial extent, and an air outlet being formed at a bottom of the structure. The outlet is adapted for connection to an air intake of the gas turbine. A plurality of curved airflow splitters separate the inlet openings and extend inwardly and downwardly from the inlet openings towards the air outlet. The airflow splitters each are formed with a perforated sheet metal exterior and contain sound attenuating material. A plurality of airflow passageways are formed by and between the airflow splitters and extend from the inlet openings towards the air outlet, these airflow passageways bending substantially and an elongate bottom section of each passageway extending substantially parallel to the vertical first axis.

Further features and advantages will become apparent from the following detailed description of preferred embodiments taken in conjunction with the accompanying drawings.

DETAILED DESCRIPTION OF PREFERRED EMBODIMENTS

Figure 1:
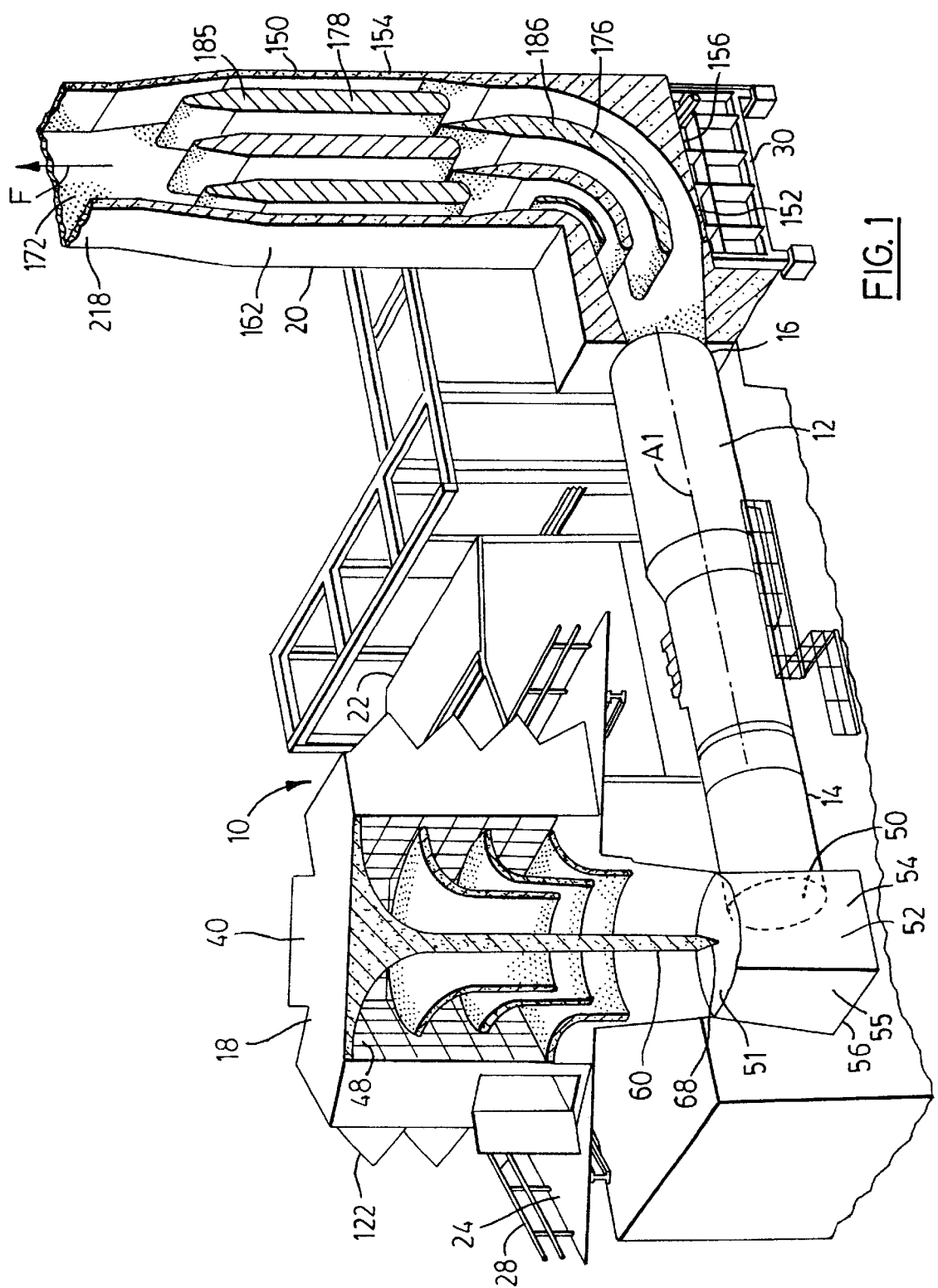
FIG. 1 is a schematic illustration of a gas turbine power installation equipped with an air duct inlet silencing apparatus and an air duct outlet silencer constructed in accordance with the invention with both the inlet silencer and the outlet silencer shown in cross section for purposes of illustration.

FIG. 1 is a schematic illustration of a power generating installation 10 wherein power is generated by a stationary gas turbine indicated generally at 12. This gas turbine extends horizontally as illustrated and it has an inlet or intake section at 14 and an outlet located at 16 at the opposite end of the turbine. Connected to the intake of the turbine is a preferred form of air duct inlet silencing apparatus 18 constructed in accordance with one aspect of the invention. It will be understood that substantial quantities of air can be drawn into the intake of the turbine via airflow passageways formed in the inlet silencer 18. Hot air exiting from the turbine through the outlet 16 passes through a sound attenuating duct unit indicated generally at 20. It will be understood that a major function of both the inlet silencer 18 and the outlet duct unit 20 is to reduce the amount of noise emanating from the gas turbine so that the noise level surrounding this installation is reduced to an acceptable level both for personnel working at the installation and others, such as people living or working close to the facility.

Some of the other features shown in FIG. 1 in whole or in part include a building 22 which houses and protects the gas turbine and which can, for example, shelter equipment and personnel used to maintain and operate the installation. Also shown is a platform 24 which extends around the inlet silencer 18 and which provides access for operating personnel to the inlet components such as filter and heat exchanging coils. Access to the platform 24 can be gained by means of a stairways 26. One version of the platform and stairways can be seen in FIG. 2. For safety reasons, a guide rail or fence 28 can extend around the outer edge of the platform.

With respect to the outlet silencer, a suitable supporting framework 30 can be provided below and around the outlet silencer in order to support same.

Figure 4:
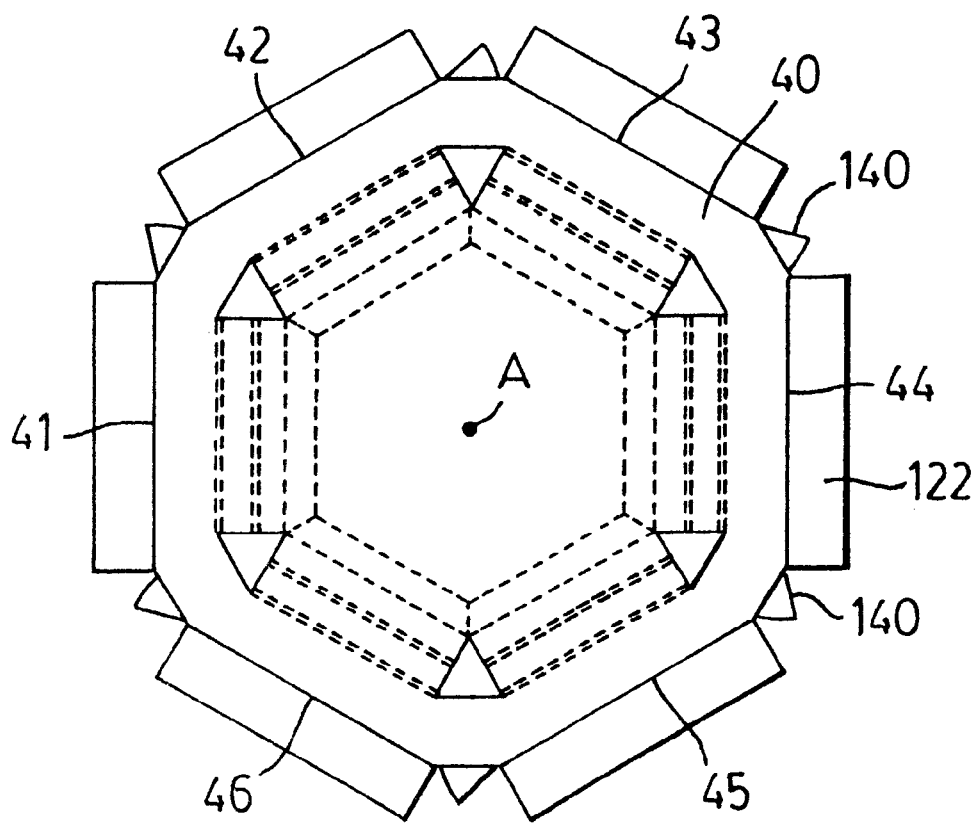
FIG. 4 is a plan view of the inlet silencer of FIG. 3, this view showing the six sides of a preferred embodiment.

Turning now to the construction of the inlet silencer 18 of the invention, as will be apparent from the foregoing, this silencing apparatus is designed for use with the stationary gas turbine 12 and the illustrated silencer can either be mounted outdoors where it will be exposed to the elements or it can be installed within a suitable building or structure. The silencing apparatus 18 includes an inlet duct structure 34 extending around a vertical first axis A and extending vertically along this first axis. The duct structure 34 has an upper duct section 36 with a plurality of vertically extending sides and a top cover or roof 40 which can comprise a horizontally extending panel such as a sheet metal panel. As indicated by FIG. 4 in one particularly preferred embodiment of the inlet silencer there are in fact six vertically extending sides 41 to 46, these sides preferably being of equal width and height and extending about the vertical axis located at A. It is also possible to construct the inlet silencer with sides of unequal width, if required by the particular installation or job site. It will be appreciated that the number of sides can be less than six, for example four sides or five sides and the actual number of sides in the structure can depend to some extent on the installation's requirement, the amount of space available, and from which side the incoming air will be entering during use of the apparatus. It will be understood that there are air inlet openings 48 formed in some or all of the vertically extending sides 41 to 46 and these openings can cover substantially all of their respective vertical sides. Assuming that there are no obstructions or adjacent structures that prevent air from entering the inlet silencer on all sides, there can normally be inlet openings 48 on all of the vertically extending sides of the structure. However there may for example be a blocking wall or other obstruction on one or more sides of the inlet silencer that prevent air from entering from these particular sides and, in such cases, there may be air inlet openings in only one, two or more but not all of the vertically extending sides. Described hereinafter are versions of the invention wherein there are inlet openings in only one side and also wherein there are inlet openings in only two sides.

An air outlet 51 is formed at a bottom end of the duct structure and this air outlet is adapted for connection to an air intake plenum 52 of the gas turbine. In the illustrated preferred embodiment, the air outlet 50 from the plenum 52 is located in a vertical plane and it has a shape, for example circular, conforming to the shape of the intake 14. The air outlet 50 can be formed on one vertical side of the air intake plenum 52 having a pair of substantially vertical sidewalls 54, an open top, and an end wall 55 and a bottom which meet at a corner 56 which can be square as shown or can be rounded. If the corner at 56 is rounded, this helps to smoothly redirect the incoming airflow from vertically downwardly to the horizontal direction. If desired, suitable turning vanes (not shown) can be arranged in the corner section 52 to assist in redirecting the airflow to the horizontal direction.

Figure 3:
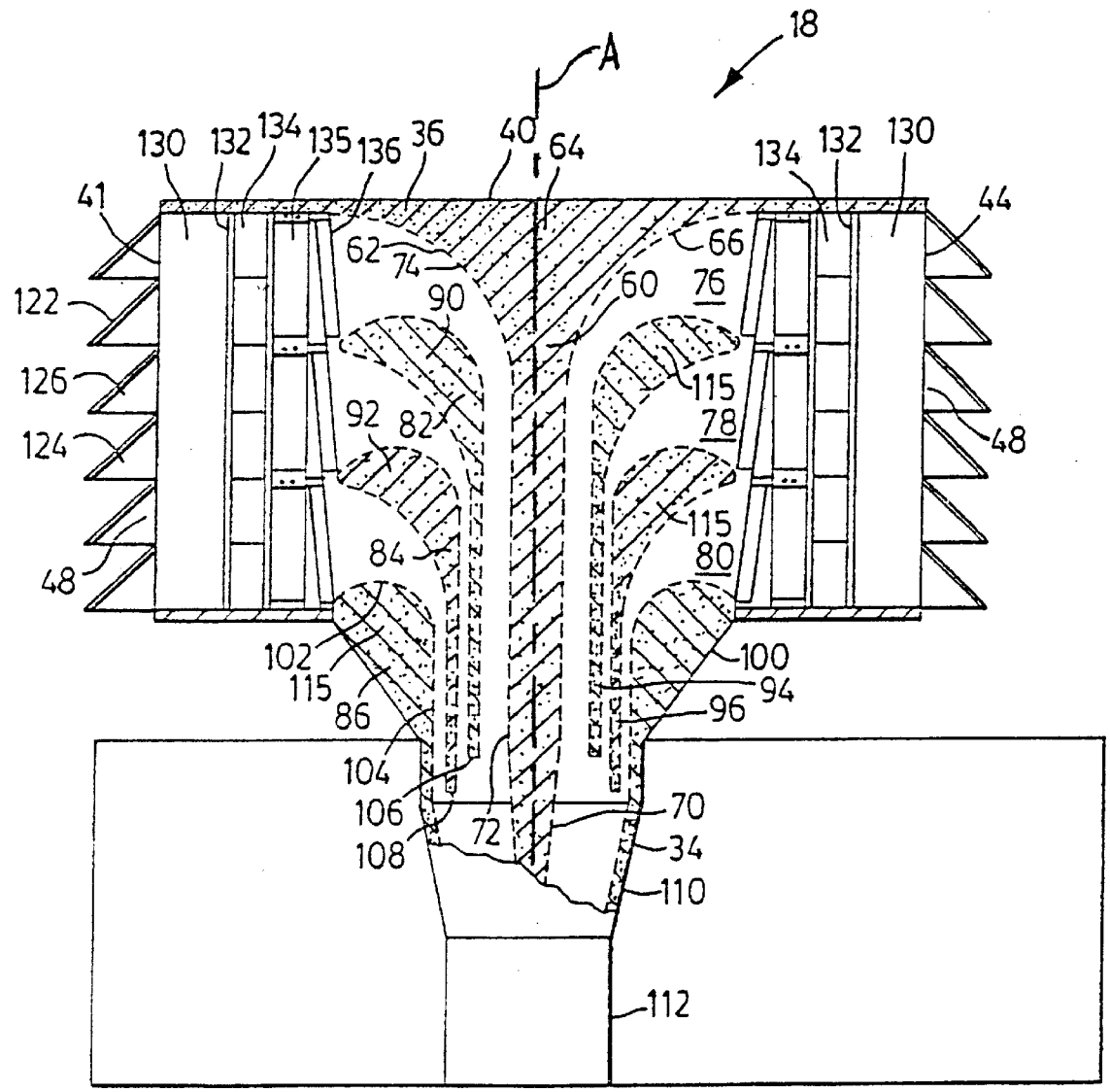
FIG. 3 is a cross-sectional elevation of the air duct inlet silencer of the invention, this view being taken along the vertical central axis of the inlet silencer.

The inlet silencer 18 also includes an elongate, centrally located airflow defining member 60 which is substantially cylindrical or multi-sided for a major portion of its length and which extends downwardly from the top cover 40 and past the air inlet openings 48. As used in this specification, in describing the member 60 and its shape, the term "cylindrical" includes a multi-sided exterior that is elongate and similar to a cylindrical shape in its transverse cross-section. The airflow defining member 60 extends around and along a vertical primary axis, which in the illustrated preferred embodiment is coaxial with the aforementioned axis A. This airflow defining member is formed with a perforated sheet metal exterior indicated at 62 and the airflow defining member contains sound attenuating material 64. The extent of the perforated sheet metal in a preferred embodiment of the member 60 can be seen from FIG. 3. As indicated in this figure, preferably the sheet metal extends over substantially the entire height of the airflow defining member including the outwardly curved section 66 but not including the top cover 40 which is not in contact with the incoming airflow. The perforated sheet metal can extend substantially to the pointed bottom end 68 of the member 60. Also shown in FIG. 3 is a tapered bottom section 70 that extends downwardly to the bottom end 60 from the central cylindrical section 72. It is also possible to construct the central airflow defining member 60 without the tapered bottom section 70. As shown in the drawings, above the central section 72 is a substantially frustoconical upper portion 74 wherein, in vertical, transverse cross section as shown in FIG. 3, the exterior sheet metal wall is concavely curved. This frustoconical upper portion extends downwardly from the top cover 40 to the cylindrical section 72. This frustoconical upper portion 74 can either be round in horizontal cross-section or it can be multi-sided. This upper portion can also be described as sloping downwardly and inwardly.

Figure 2:
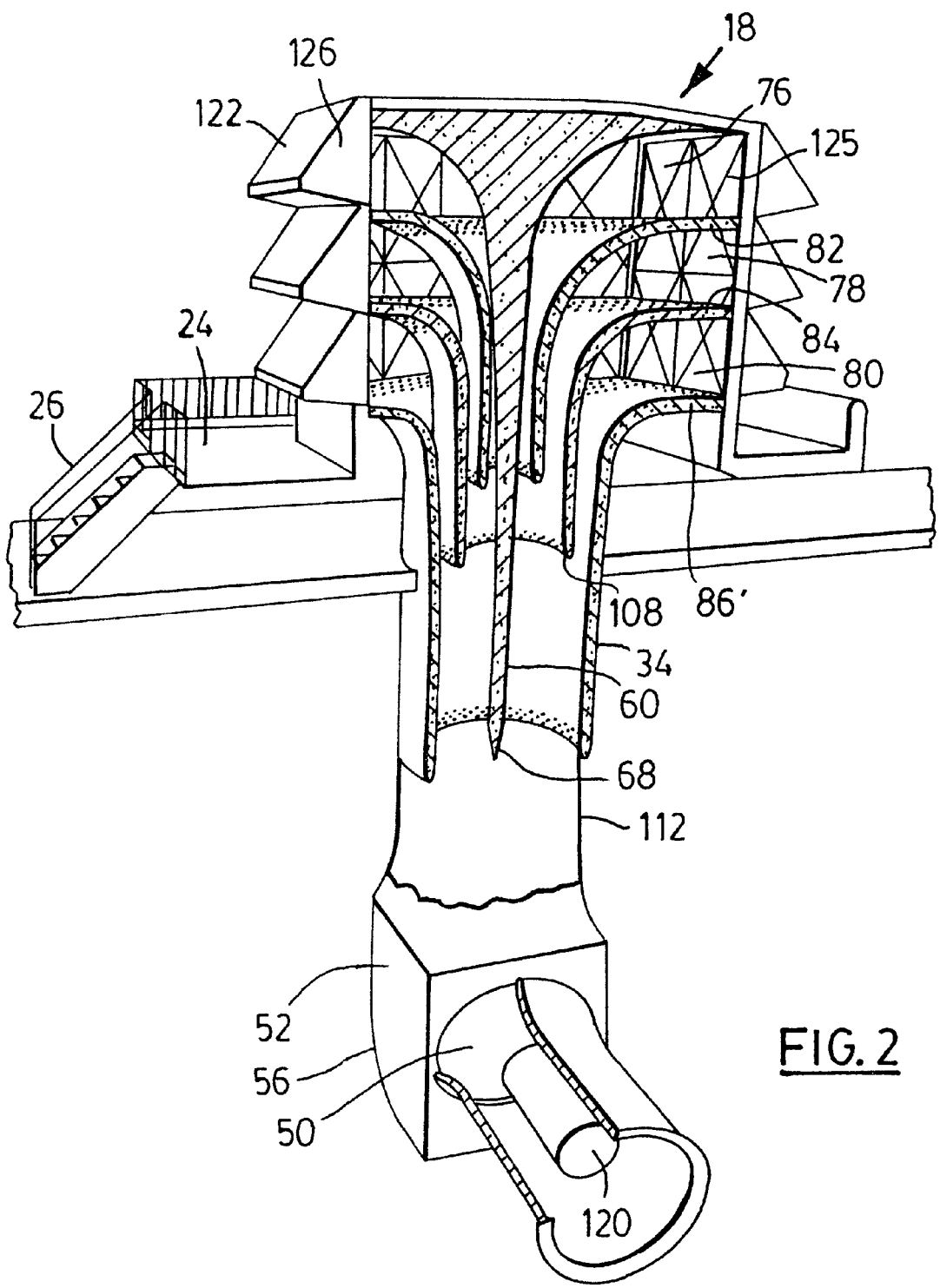
FIG. 2 is a perspective view in cross section showing a preferred form of air duct inlet silencer with the cross section of the inlet silencer itself being taken in a vertical plane.

The version of the inlet silencer 18 of FIGS. 1 to 3 includes two or more annular airflow passageways extending from the air inlet openings 48 towards the air outlet of the silencer with each passageway being defined by at least one interior wall mounted in the duct structure. As shown in FIGS. 1 to 3, these airflow passageways each bend substantially so that a bottom section thereof extends substantially vertically, that is, parallel to the vertical first axis A. In the illustrated preferred embodiment there are three of these annular passageways 76, 78 and 80. With respect to the passageway 76, it is defined by the sheet metal exterior 62 of the airflow defining member 60 on one side and by the interior wall 82 on the opposite or outer side. With respect to the airflow passageway 78, this passageway is defined by the interior wall 82 on one side, that is the upper or inner side, and by an interior wall 84 on the opposite or outer side. With respect to the bottommost annular passageway 80, it is defined by the interior wall 84 and an annular wall structure 86. It will be noted that FIGS. 2 and 3 show different versions of the interior walls 82, 84 and of the annular wall structure 86. In the version of FIG. 2, the two interior walls 82, 84 are of substantially uniform thickness and their thickness corresponds to the thickness of annular wall structure 86'. This uniform thickness is due to the fact that both inner and outer surfaces of the curved section of each of these interior walls and the wall structure 86' have the same center of curvature. All of the interior walls 82, 84 of FIGS. 1 to 3 can be described generally as being substantially funnel-shaped.

However in the embodiment of FIGS. 1 and 3, the interior walls 82,84 vary in their thickness with each having a relatively thick upper section at 90 and 92 and a relatively thin, cylindrical or multi-sided lower portion indicated at 94 and 96. Each of the upper sections 90,92 commences at a point and then the two sides of the wall section diverge to the widest point of the wall section before again converging to the cylindrical or multi-sided section 94 or 96. It will thus be seen that the radius of curvature on one side of the upper section 90 or 92 is smaller than on the opposite or bottom side. It will be appreciated that this arrangement provides for the use of a maximum amount of sound attenuating material in the upper region of the inlet silencer resulting in excellent sound attenuating ability. The annular wall structure 86 shown in FIG. 3 has an inwardly sloping exterior surface at 100 which is made of imperforate sheet metal while the interior surface of this structure has a curved upper portion 102 which leads smoothly to a cylindrical or multi-sided lower portion 104. Both of these portions of the interior surface are preferably constructed from perforated sheet metal. The annular wall structure 86 can alternatively be constructed in the manner shown in FIG. 1 wherein the exterior of the lower portion is cylindrical.

Also it will be seen from FIGS. 2 and 3 that the bottom end of the interior walls 82,84 can terminate at different heights and at a height above the bottom end 68 of the airflow defining member 60. In particular the bottom end 106 of the innermost interior wall 82 can be above the bottom end 108 of the interior wall 84. Both of these bottom ends are substantially above the bottom end 68. Also in the version of FIG. 3, the conical bottom section 70 of the airflow defining member 60 extends into a transition duct section 110 which, in the illustrated version tapers inwardly in the downwards direction and connects to a rectangular duct section 112. It is also possible to construct the transition duct section 110 so that it does not have a tapered exterior. In the duct section 110, the horizontal cross-section of the airflow passageway is changed in a manner known per se from circular or multi-sided (at the top) to rectangular.

It will be further understood that each of the interior walls 82,84 is filled with sound attenuating material indicated at 115. This material can comprise compressed bats of fibre-glass or mineral wool, for example. Also the annular wall structure at 86 is filled with sound attenuating material 115. It will also be understood that the central and lower sections of the member 60 and the interior walls 82,84 are rigidly supported by suitable supporting frames or struts (not shown) that are connected thereto and that do not materially interfere with the incoming airflows. These narrow struts can be connected at their outer ends to walls located radially outwardly from the member 60 or the interior wall.

The thick upper sections 90,92 of the two interior walls are connected to corresponding upper sections on the adjacent sides of the silencer and thus together they form multi-sided upper sections of the interior walls. This can be seen more clearly from FIG. 4. The upper sections can also be substantially conical as illustrated in FIG. 2 where the upper sections of the interior walls have a substantially uniform thickness.

Also as illustrated in FIGS. 1 and 2, it will be seen that the air duct inlet structure includes the aforementioned air intake plenum 52 which is a form of duct elbow that, in the illustrated preferred embodiment, bends approximately 90 degrees.

Returning to the gas turbine that is connected to the outlet of the air inlet silencer 18, it will be seen from FIG. 1 that this turbine is elongate and it will be appreciated that it has a central longitudinal axis indicated by the dash line A1 in FIG. 1 about which the blades of the gas turbine rotate during use thereof. Thus in the power generating installation illustrated in FIG. 1, the central longitudinal axis A1 of the gas turbine is substantially horizontal and is substantially perpendicular to the central longitudinal axis A of the airflow defining member 60.

If desired, an optional feature of the intake 14 for the turbine is a central, sound attenuating bullet 120 which can have a cylindrical exterior and which can be filled with sound attenuating material and covered with perforated sheet metal. Suitable, radially extending struts (not shown), that do not interfere with the airflow, can be used to mount this central bullet which also helps to reduce the amount of sound being emitted from the intake end of the turbine.

If the inlet silencer 18 is to be mounted in the open, which would generally be the case because of its size, the upper section thereof is constructed so as to provide some protection from the elements including rain and snow. Shown in the drawings are a series of weather hoods 122 which can be arranged over the inlet openings 48. Thus if inlet openings are arranged on all sides of the inlet silencer, these hoods are mounted on all of the sides. Each hood can have a steeply sloping panel 124 and arranged at each end of this panel are vertically extending end walls 126 that connect the ends of the panel 124 to supporting framework 125 (see FIG. 2) for the upper section of the inlet silencer. Preferably there is a narrow corridor 130 arranged just inside the hoods, this corridor allowing maintenance personnel to gain access to the filters of the inlet silencer. Covering the inner wall of this corridor in a preferred embodiment is a prefilter 132 which can be relatively thin. If desired or if required by the particular installation, a plurality of so called final filters 134 can be stacked one on top of the other adjacent the prefilter 132. It will be understood that these filters, if used can extend the entire width and height of the inlet openings 48. Immediately downstream of the filters, there can be arranged a heat exchanger such as an evaporative cooler 135 and there can be several of these cooler units arranged one above the other to cover the entire height of the inlet openings. Preferably, just downstream of the cooler are several drift eliminators 136 which can be generally of standard construction and which help prevent any moisture from entering the airflow passageways 76,78, and 80.

An additional preferred feature shown in FIG. 4 is the use of one of or a plurality of access doors 140. As illustrated, there is one such door for each corner where two sides of the inlet silencer meet. These doors provide access to the aforementioned corridor 130.

As shown in FIG. 4, the internal walls 82,84 as seen in horizontal cross section are not circular but rather are multi-sided. In the case of the preferred embodiment shown in FIG. 4, these internal walls are six sided. Because of this, these internal walls and also the wall structure 86 which is also multi-sided are relatively easy to build as the curved, perforated metal panels used to make these walls need only be curved in one direction. It also becomes relatively easy to weld adjacent panel sections together to form a complete internal wall 82 or 84 or the lower wall structure 86.

Figure 5:
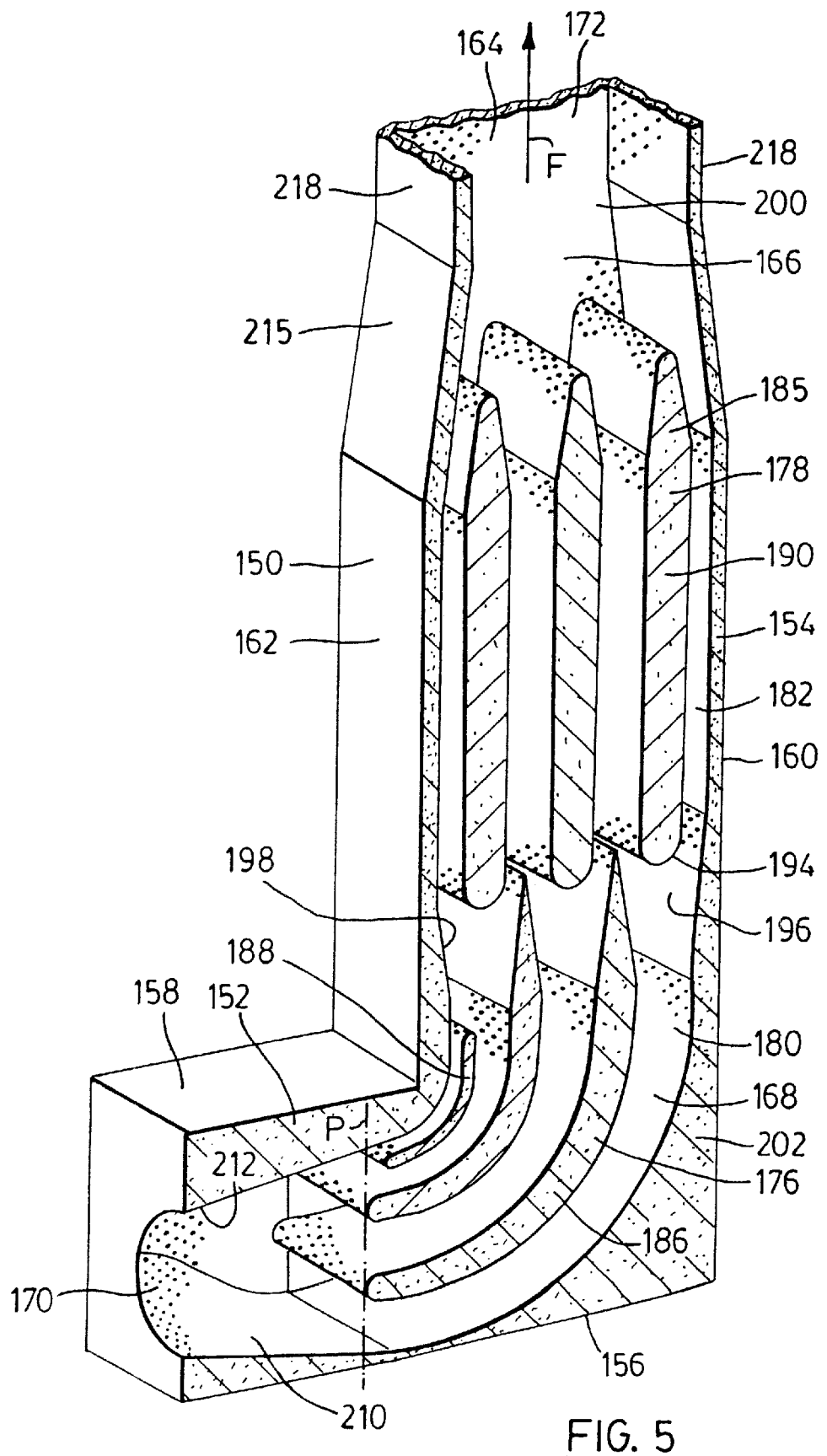
FIG. 5 is a perspective cross-sectional view of a preferred form of air duct outlet silencer construction in accordance with the invention, this view being taken in a vertical plane extending through the horizontal central axis of the inlet portion of the silencer.

Reference will now be made to FIGS. 1 and 5 which illustrate a preferred version of a sound attenuating duct unit 20 suitable for the outlet of the gas turbine. With particular reference to FIG. 5, the outlet silencer, which is shown along a vertical cross section, has a housing 150 that includes a horizontal housing section 152 and a vertical housing section 154. This housing can have flat, exterior side walls as shown in FIG. 5 including horizontal bottom wall 156, a shorter horizontal wall 158 and vertical side walls including walls 160,162 and 164. It will be appreciated that there is another side wall (not shown) that extends vertically and that is located opposite the side wall 164. These side walls surround a main airflow passageway 166 that extends along a substantial bend, such as the illustrated 90 degree bend at 168. There is an air inlet 170 located at one end of the horizontal housing section and adapted for connection to the outlet of the gas turbine 12. There is also an air outlet 172 located at upper end of the vertical housing section.

Located within the main airflow passageway 166 are at least a first series 176 and a second series 178 of splitters with the splitters of each series being spaced apart to form smaller air passageways 180,182 and being mounted side-by-side in a row. The second series 178 is positioned downstream in the main airflow passageway 166 relative to the first series 176 and is staggered relative to the first series in a direction generally transverse to the direction of airflow indicated by the arrow F in FIGS. 1 and 5. As illustrated the second series of splitters has three, straight elongate splitters 185 while the first series has two curved, relatively large splitters 186 and an inside, smaller splitter or turning vane 188. As is known per se in the sound attenuating art for air handling ducts, each of the larger splitters 185,186 contains sound attenuating material indicated at 190. However in order that the outlet silencer 20 and the splitters mounted therein can withstand the high temperatures of the airflow exiting from the turbine, the sound attenuating material is not made from standard fibreglass bats, but is a material capable of withstanding these high airflow temperatures of at least 500 degrees Celsius or more. The preferred sound attenuating material for this purpose is ceramic fiber or mineral wool because of their reasonable cost. The exterior of the splitters is substantially formed by perforated sheet metal and is preferably stainless steel.

Figure 6:
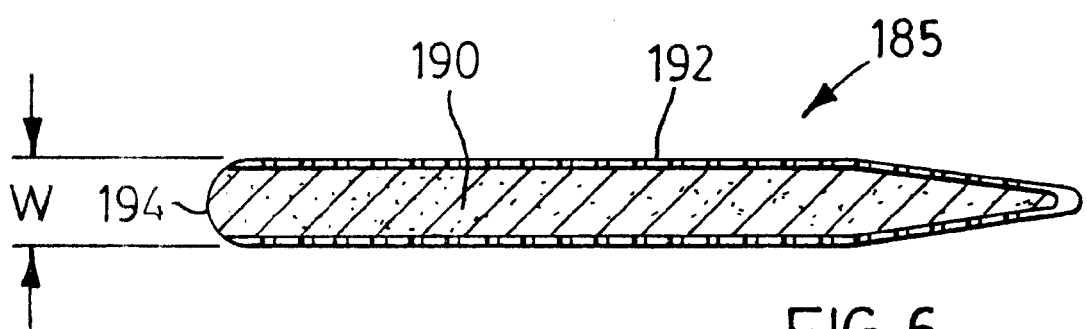
FIG. 6 is a transverse cross-section of an elongate splitter used in the outlet silencer of FIG. 5.

Shown in FIG. 6 is one of the large splitters 185. Illustrated in this figure is the preferred feature of a layer of stainless steel screen 192 which is arranged directly behind the perforated sheet metal, this screen helping to prevent the escape of the sound attenuating material through the holes in the perforated sheet metal. Instead of using this metal screen, it is also possible to encapsulate the sound attenuating material in woven fiber bags. Also shown is the semi-cylindrical bottom end 194 of the splitter and preferably this bottom end is covered with imperforate sheet metal, again preferably stainless steel.

As shown both in FIGS. 1 and 5, the first series of splitters 176 extends through a substantial bend, this bend normally corresponding to the bend in the main airflow passageway which, in the illustrated embodiment is a bend of 90 degrees. This substantial bend is in the direction extending from the leading edge of these splitters to the trailing edge thereof. It will be also noted that both series of splitters extend transversely across the passageway from one side thereof to the opposite side and their opposite side edges are rigidly connected to the walls of the outlet silencer, for example by welding.

Another feature that can be seen from FIG. 5 is that the inner sides of the aforementioned sidewalls of the outlet silencer are also made from perforated sheet metal panels including the panels indicated at 196,198 and 200. Arranged between the interior panels and the exterior metal panels that form the sidewalls of the outlet silencer is further insulating sound attenuating material indicated at 202. Again, as was the case with the splitters, this material must be capable of withstanding airflow temperatures of at least 500 degrees Celsius and more and the preferred sound attenuating material is ceramic fiber or mineral wool. Also, unlike previously known sound attenuating units used for reducing sound from simple axial fans, the perforated metal itself must generally be made thicker in order to withstand the much higher temperatures in the airflow. In particular both the inner surfaces of the sidewalls forming the main airflow passageway and the perforated metal sidewalls forming the splitters are made from perforated sheet metal having a thickness of at least 12 gauge. It has been found that with the use of this thicker sheet metal, the panels covering the splitters and the interior surfaces of the sidewalls will not bend and distort when their temperatures become elevated and they are subjected to stresses and other forces acting thereon. Also all of the metal components that are exposed to the hot air stream are constructed so as to allow for quick expansion when exposed to high temperature gradients within a few seconds of turbine startup.

The horizontal housing section 152 includes a duct transition section formed by interior wall panels including panels 210 and 212. This transition section extends approximately between the aforementioned air inlet 170 which is circular and approximately a transverse plane along the main airflow passageway (located at P) where leading edges of the first series of splitters are positioned. It will be understood that the transverse cross section of the main airflow passageway in this section changes gradually from circular to rectangular.

As shown in FIG. 5, there is also a transition section adjacent the top of the second series of splitters. In this transition section, the sidewalls 160,162 taper inwardly in the upwards direction. Each sidewall then becomes vertical again at 218. It is also possible to taper the sidewall 164 inwardly at this transition section along with its opposite wall, if desired. It will be understood that the top air outlet 172 can be connected to a suitable emission stack extending vertically upwardly therefrom.

Preferably the stainless steel sheet metal that is used to construct the exterior of the splitters and the interior sidewalls has an open area of at least 30% of the total sheet area. Also as can be seen from FIGS. 1 and 5, preferably the individual width of most smaller air passageways 180,182 is about equal to the transverse width W (see FIG. 6) of an adjacent splitter.

With respect to the use of stainless steel in the outlet silencer, it will be appreciated that use of this relatively expensive metal is normally only required in those regions of the outlet silencer that experience high temperatures i.e. in excess of 500 degrees Celsius. In substantially cooler areas such as the exterior surfaces of the outlet silencer, imperforate, galvanized sheet metal can be used.

In a preferred embodiment of the outlet silencer employing mineral wool, the insulation is packed to a density of about 6 pounds per cubic foot in order to obtain good sound attenuation characteristics.

It will be appreciated that the 12 gauge sheet metal that is used in the outlet silencer, which is close to $\frac{1}{8}$" thick, is approximately double the thickness that has been used in the past with standard inlet and outlet silencers designed for axial fans. Such previously known outlet silencers commonly use 16 gauge perforated sheet metal, that is sheet metal having a thickness of $\frac{1}{16}$" inch.

As indicated, mineral wool is a preferred sound attenuating material because of its low cost and its ability to withstand high temperatures. Other sound attenuating materials which can be used for this purpose but which are more expensive include ceramic fibers and silica fibers.

In one preferred embodiment of the inlet silencer 18 as illustrated in FIG. 3, the width of the corridor 130 is about 2 feet and generally the width should be as narrow as possible. The thickness of the preferred pre-filter is 2" and can range up to 4" while the final filter can have a thickness of about 12". Although not illustrated, the inlet silencer can be fitted with a standard drain pan located just downstream of the cooler coils 135 to permit condensation from the coils and from the drift eliminators to drain out. A detailed description of this drain pan herein is deemed unnecessary as such draining pans are well known in the heat exchanging art.

Figure 7:
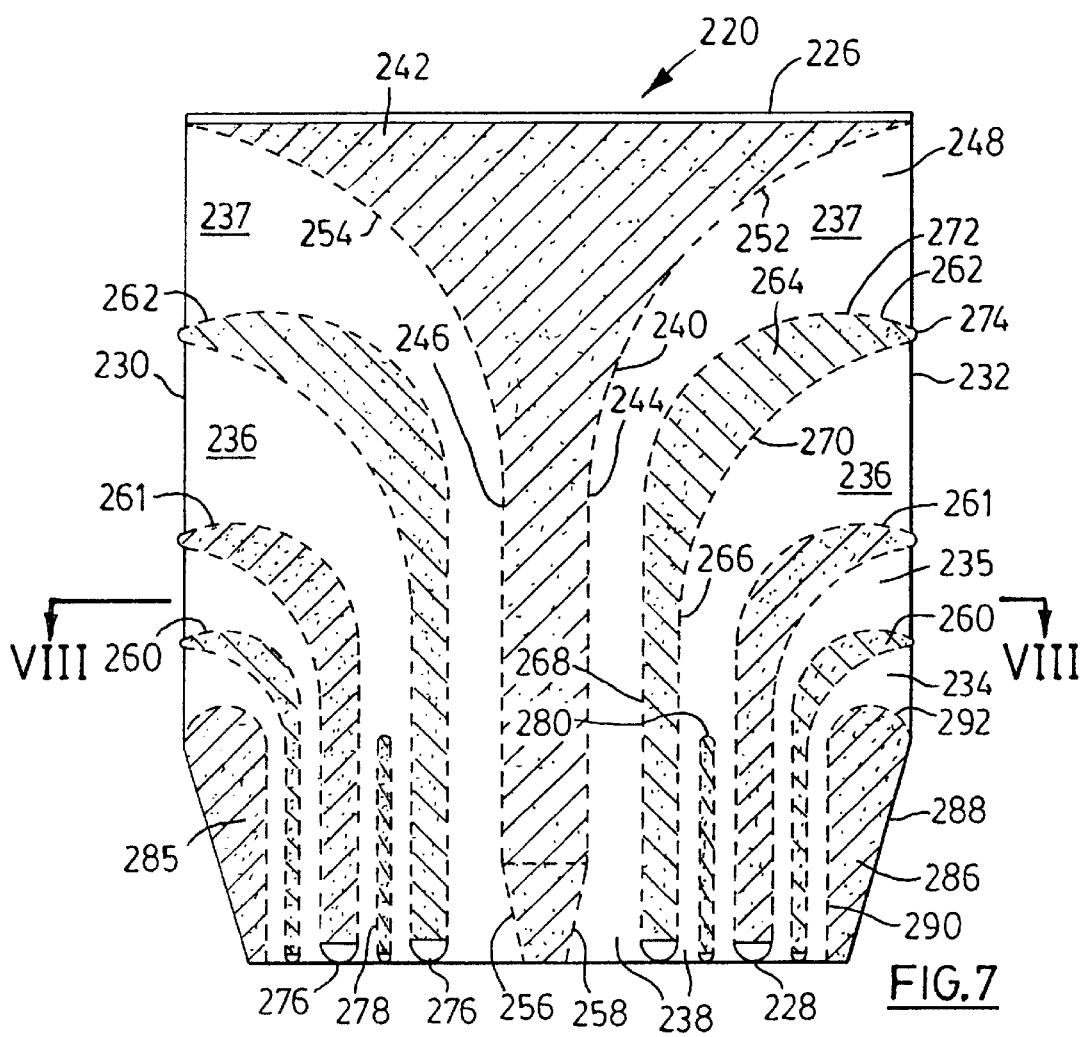
FIG. 7 is a cross-sectional elevation taken along the line VII—VII of FIG. 8 illustrating an air duct silencing apparatus having air inlets on two opposite sides thereof.
Figure 8:
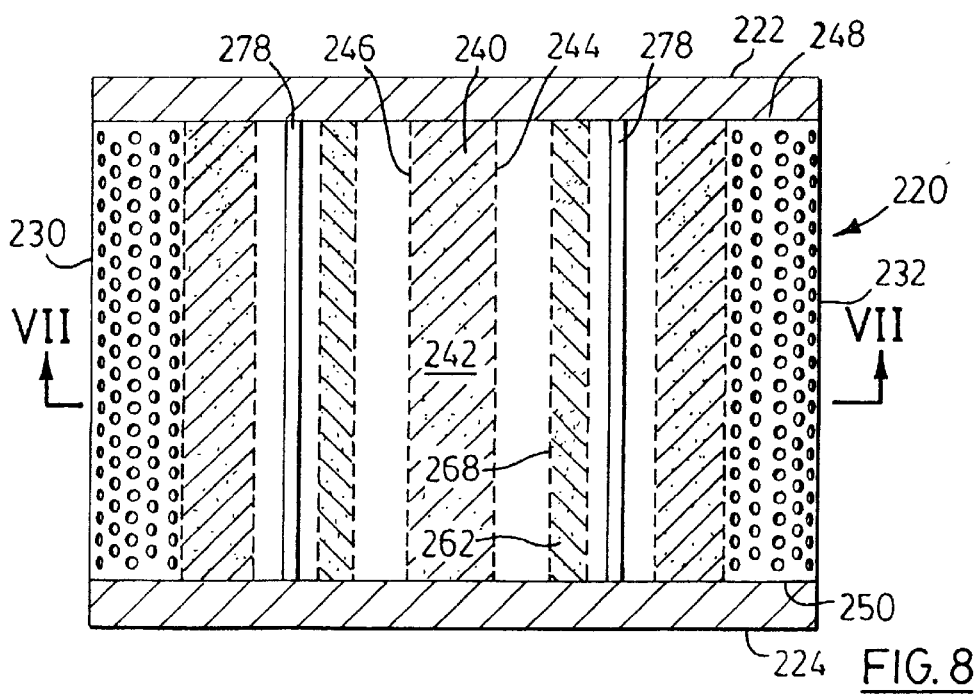
FIG. 8 is a horizontal cross-section of the same air duct silencing apparatus taken along the line VIII—VIII of FIG. 7.

FIGS. 7 and 8 illustrate another embodiment of an air duct silencing apparatus constructed in accordance with the invention. This silencing apparatus indicated generally at 220 also comprises a vertically extending duct structure that can be used to provide an airflow into the intake of a stationary turbine. It will be understood that this silencing apparatus 220 can be mounted on top of an air intake plenum such as the plenum 52 illustrated in FIG. 1 or FIG. 2 of the drawings. It would take the place of the air duct silencing apparatus that is located above the plenum 52 in FIGS. 1 and 2. The illustrated silencing apparatus 220 has four vertically extending sides with two of these sides indicated at 222 and 224 being completely enclosed and two of the sides being substantially open to allow airflow into the apparatus. The apparatus 220 has a horizontal top cover 226 which can be formed of imperforate sheet metal, such as galvanized steel. The illustrated apparatus has a rectangular bottom 228 which can be suitably constructed for mounting on the aforementioned air inlet plenum 52 or for mounting on a transition duct (if required). There preferably are a plurality of inlet openings located on two opposing sides 230,232 of the apparatus. As illustrated, there are four openings 234 to 237 on each of these sides. As illustrated there are a number of slit-like air outlets 238 formed in the bottom of the structure and, as indicated, these outlets are adapted for connection to an air intake of a gas turbine such as that illustrated in FIG. 1. It will be appreciated by one skilled in the art that the vertically extending sides of the apparatus 220 can be extended downwardly from the bottom location shown in FIG. 7 and, if this is done, the apparatus 220 can effectively have a single air outlet formed in its bottom end as the internal, airflow splitting members, described hereinafter, can be made so as to terminate above the bottom of the apparatus and above the single outlet.

The silencing apparatus 220 like the silencing apparatus of FIGS. 1 and 2 also has an elongate centrally located airflow defining member 240 which extends downwardly from the top cover and pass the air inlet openings 234 to 237. The member 240 has its exterior formed with perforated sheet metal and it contains sound attenuating material 242. However, unlike the central airflow defining member of FIGS. 1 and 2, the member 240 has a lower section with opposing, planar, vertical walls 244 and 246. These walls extend substantially from one side of the apparatus to the opposite side as indicated in FIG. 8. These perforated, sheet metal walls can extend to vertical, interior walls 248 and 250 which can also be perforated, if desired. Extending upwardly from these planar wall sections are curved, upper wall sections 252 and 254, which, as illustrated, are cylindrical arcs that extend upwardly through a bend of almost 90 degrees, terminating at the top cover. If desired, there can also be short, inwardly tapering wall sections 256 and 258 extending downwardly from the planar walls 244,246.

The apparatus 220 is also formed with interior walls or splitters 260 to 262, these interior walls being provided in pairs with a wall of each pair located on a respective side of the central airflow defining member 240. Although these interior walls vary in size as shown in FIG. 7, they are each of similar construction. Therefore it will suffice herein to describe one of the interior walls 262. Each of these interior walls 260 to 262 is filled with sound attenuating material 264. The lower section of each wall 262 has opposing, perforated planar sheet metal panels indicated at 266 and 268. These planar wall sections extend from the aforementioned interior wall 248 to the opposite interior wall 250. Located above these planar sections are curved upper sections 270 and 272 which can also be made of perforated sheet metal. These curved upper sections terminate approximately at the adjacent air inlet openings and, in the region of these openings, they converge to meet at a horizontally extending, leading edge 274. If desired, the bottom of each of these interior walls can be formed with a semi-cylindrical bottom piece 276 which, as illustrated, is located at the level of the aforementioned outlets 238. If desired, there can also be short interior dividing walls or splitters, two of which are indicated at 278 and these can be formed with opposing planar sides and a rounded front at 280. The opposing planar sides of these walls can also be perforated and these short interior walls are also filled with sound attenuating material.

The silencing apparatus 220 is formed with two insulated outer wall sections 285 and 286 which extend between the aforementioned interior walls 248,250. The exterior surface of these walls is made of imperforate sheet metal 288 and it will be seen that these planar sheet metal panels can slope inwardly at a small acute angle to the vertical plane. The inner surface of these walls is formed with perforated sheet metal and each inner surface includes a planar section 290 that extends upwardly from the bottom of the apparatus to a semi-cylindrical top section 292. Each inlet opening 234 is located between the curved upper section 292 and the lowermost interior wall 260 adjacent thereto.

Figure 9:
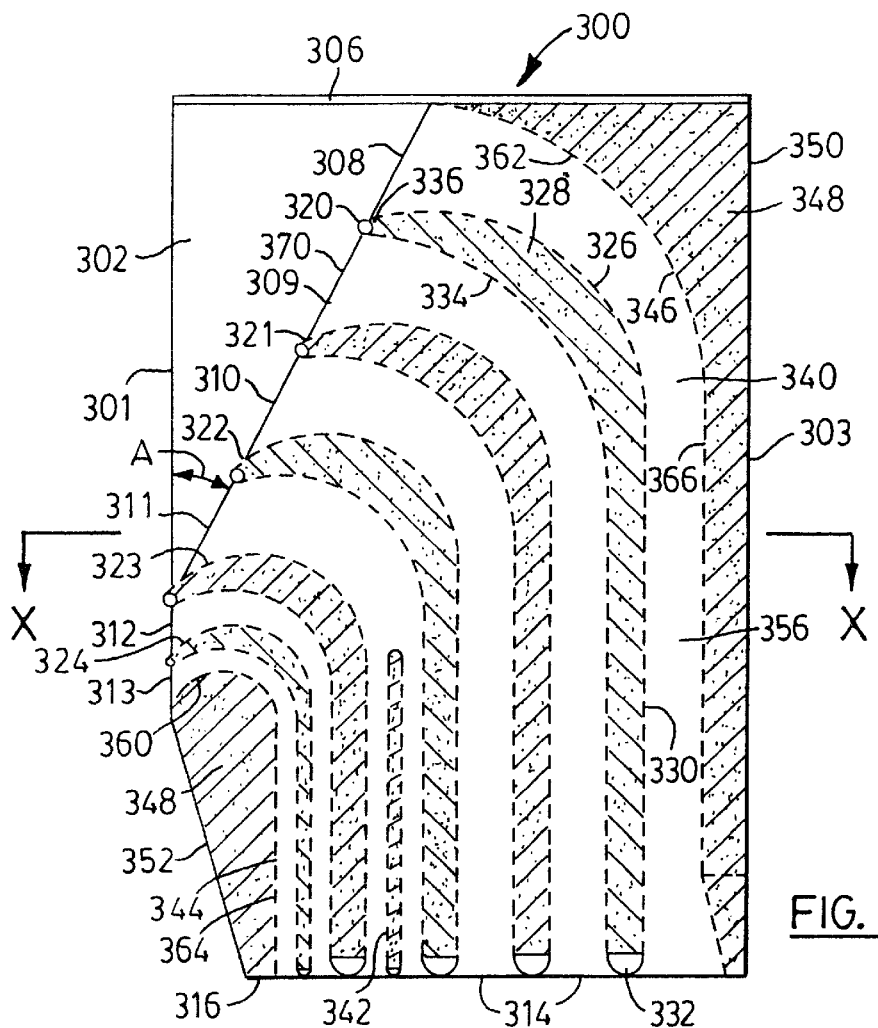
FIG. 9 is a cross-sectional elevation taken along the line IX—IX of FIG. 10 illustrating another embodiment of an air duct silencing apparatus having air inlets opening on one side only of the apparatus.
Figure 10:
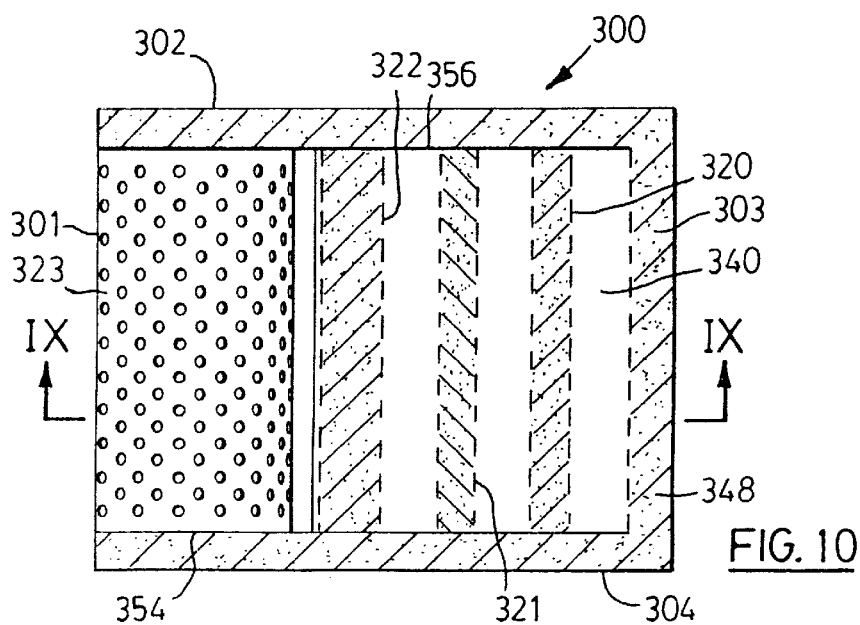
FIG. 10 is a horizontal cross-section of the apparatus of FIG. 9 taken along the line of X—X of FIG. 9.

Turning now to the further embodiment of an air duct silencing apparatus which is illustrated in FIGS. 9 and 10, this silencing apparatus is indicated generally at 300 and will be understood that this apparatus is also for use at an inlet of a stationary gas turbine such as the turbine illustrated in FIG. 1. It will be further understood that the apparatus illustrated in FIGS. 9 and 10 can be the upper duct duct section of a vertically extending duct structure that includes, for example, an air inlet plenum such as the plenum 52 illustrated in FIGS. 1 and 2. The upper duct section 300 as illustrated has four vertically extending sides including three enclosed sides indicated at 302 to 304. The silencing apparatus 300 further includes a top cover 306 which can be rectangular and made of imperforate galvanized sheet metal. In this duct structure are a plurality of inlet openings that are located on one of the vertically extending sides of the structure. As illustrated, there are six of these openings identified by references 308 to 313 with the opening 308 being adjacent top cover 306 and the opening 313 being the lowermost opening. As shown in FIG. 9, the size of these openings can vary with the bottommost openings 312,313 in the illustrated embodiment being substantially smaller than the uppermost openings 308 to 311. Thus the side 301 of the silencing apparatus is an open side to a substantial extent. Also, the apparatus illustrated in FIGS. 9 and 10 has a plurality of air outlets 314 formed at the bottom end 316 thereof. However, it will be apparent to those skilled in the art that the exterior side walls of the apparatus 300 can readily be extended downwardly from the location shown and beyond the bottom of the curved airflow splitters (described below) so that there is in effect a single air outlet (or only two or three outlets) formed at the bottom of the structure. In any event, the outlet or outlets 314 are adapted for connection to an air intake of the gas turbine, for example, by means of the aforementioned air inlet plenum 52.

Arranged within the silencing apparatus 300 are a plurality of curved airflow splitters that separate the inlet openings 308 to 313 and that extend inwardly and downwardly from these inlet openings towards the air outlet or air outlets. In the illustrated embodiment there are five of these airflow splitters indicated at 320 to 324. As these splitters are each of similar construction in the illustrated preferred embodiment, it will be sufficient herein to describe the construction of the uppermost splitter 320. Each of these splitters is formed with a perforated sheet metal exterior indicated generally at 326 and is filled with sound attenuating material 328. Each splitter, including the splitter 320 has an elongate, vertically extending planar section 330, the bottom of which is located at the bottom 316 of the apparatus. This planar section can terminate with a semi-cylindrical bottom edge member 332 if desired. Extending upwardly from the planar section is a substantially curved upper section 334, the curved sides of which converge at the inlet openings to meet at a front edge 336 which extends horizontally.

There are a plurality of airflow passageways 340 that are formed by and between the airflow splitters in the silencing apparatus 300. The airflow passageways extend from the inlet openings 308 to 313 towards the air outlet or air outlets. As shown in FIG. 9, these airflow passageways bend substantially and an elongate section of each passageway extends substantially vertically. It will be understood that the number of airflow splitters will vary but, generally speaking, in a preferred embodiment of this silencing apparatus 300 there are at least three of the airflow splitters. Smaller splitters such as the illustrated splitter 342 can be provided in one or more of the main airflow passageways if desired. The smaller splitter 342 is relatively thin and it has only flat sides with no curved upper section. The inclusion of a smaller splitter of this type may be desirable in some installations in order to provide an improved, more uniform airflow from the air outlet and to provide improved sound attenuation.

The illustrated silencing apparatus 300 also has two interior walls indicated at 344 and 346 which originally mounted in the duct structure on opposite sides of the airflow passageways. These two interior walls are also formed with perforated sheet metal and sound attenuating material 348 is arranged between each of these interior walls and adjacent exterior side wall 350,352 of the duct structure. These two interior walls extend across the width of the silencing apparatus from vertically extending interior wall 354 to vertically extending interior wall 356 (see FIG. 10). Sound attenuating material can also be provided behind the interior walls 354,356. Each of the interior walls 344,346 has a substantially curved upper wall section 360,362 and a planar lower wall section 364,366 which extends vertically downwardly from its corresponding upper wall section. The curved upper wall section 360 can have a semi-cylindrical shape as shown in FIG. 9.

A preferred feature of the silencing apparatus 300 is the arrangement of the inlet openings 308 to 311 as illustrated in FIG. 9. These inlet openings which constitute most of the inlet opening area are arranged substantially in a first plane indicated at 370 which extends at an acute angle to a vertical plane defined by the vertically extending side 301. The first plane 370 slopes upwardly and inwardly towards a center of the top cover 306. With this arrangement, the larger, upper openings are protected to some extent from the elements by the top cover 306 and the sides 302 and 304. The top cover 306 tends to prevent rain from falling into the inlet openings 308 to 311 and thus prevents this water from being drawn into the airflow passageways and eventually into the turbine intake. Of course, it is also possible to provide a weather hood similar to the weather hoods 122 illustrated in FIG. 3 on the silencing apparatus 300. For example a weather hood could be attached to the edge of the top cover 306 at the side 301, thereby effectively extending the protection of the top cover.

It will be appreciated by those skilled in the air handling art that the inlet silencer 18 of the present invention is able to provide the advantages of a low pressure drop in the airflow and smooth transitions from low to high speed flow, the latter being at the entrance of the gas turbine. The low pressure drop is achieved with good aerodynamic design with gradual contraction and expansion in the duct profiles and with uniform air distribution across the filters and coils. Both the inlet silencer and the outlet silencer can be made relatively compact so as to take up a smaller area or distance than previously known silencer constructions.

It will be understood by those skilled in the art that various modifications and changes can be made to both the preferred inlet silencer and the outlet silencer as described above without departing from the spirit and scope of this invention. Accordingly all such modifications and changes as fall within the scope of the appended claims are intended to be part of this invention.

I claim:

1. An air duct inlet silencing apparatus for use with a stationary gas turbine, said silencing apparatus comprising:
    an inlet duct structure extending around a vertical first axis and extending vertically along said first axis, said duct structure having an upper duct section with a plurality of vertically extending sides and a top cover, an inlet opening being formed in at least two of said vertically extending sides and an air outlet being formed at a bottom end of said structure, said outlet being adapted for connection to an air intake of said gas turbine;
    an elongate centrally located, airflow defining member which extends around a vertical primary axis and extends downwardly from said top cover, past said air inlet openings, and along said primary axis, said airflow defining member being formed with a perforated sheet metal exterior and containing sound attenuating material;
    airflow passageways extending from said air inlet openings towards said air outlet and each defined by at least one interior wall mounted in said duct structure, each airflow passageway bending substantially so that a bottom section thereof extends substantially parallel to said vertical first axis,
    wherein a substantial portion of said at least one interior wall is made of perforated sheet metal and sound attenuating material is contained in said at least one interior wall and is covered by said perforated sheet metal.

2. An air duct silencing apparatus according to claim 1 wherein said upper duct section has at least four vertically extending sides and said air inlet openings are formed in all of said vertically extending sides.

3. An air duct silencing apparatus according to claim 2 wherein said airflow defining member includes a downwardly and inwardly sloping upper portion that extends downwardly from said top cover to a substantially cylindrical or multi-sided lower portion thereof.

4. An air duct silencing apparatus according to claim 3 wherein there are two of the interior walls mounted in said duct structure and three of said airflow passageways extending from said air inlet openings toward said air outlet and wherein each of said interior walls has a substantially inwardly and downwardly curved upper section and a substantially cylindrical or multi-sided lower section so that each interior wall is substantially funnel-shaped.

5. An air duct silencing apparatus according to claim 1 wherein said upper duct section has six sides, each of which lies substantially in a vertical plane extending parallel to said first axis, and said air inlet openings are formed in all six of said sides.

6. An air duct silencing apparatus according to claim 2 wherein said duct structure includes an air inlet plenum forming a duct elbow that bends approximately 90 degrees and wherein said air outlet is located at an end of said air inlet plenum.

7. An air duct silencing apparatus according to claim 6 wherein said airflow defining member includes a substantially downwardly and inwardly sloping upper portion that extends downwardly from said top cover to a substantially cylindrical or multi-sided lower portion thereof, there are at least two of the interior walls mounted in said duct structure and at least three of said airflow passageways extending from said air inlet openings toward said air outlet and each of said interior walls has a substantially downwardly and inwardly curved upper structure and a substantially cylindrical or multi-sided lower section so that each interior wall is substantially funnel-shaped.

8. A combination of a gas turbine intended for use at a stationary site and an air inlet silencing apparatus connected to an air intake of said gas turbine, said silencing apparatus comprising:
  an inlet duct structure extending around a vertical first axis and extending along said first axis, said duct structure having an upper duct section with a plurality of vertically extending sides and a top cover, air inlet openings being formed in at least two of said vertically extending sides, and an air outlet being formed at a bottom end of said structure, said outlet being connected to said air intake of said gas turbine;
  an elongate, centrally located, airflow defining member which extends around a vertical primary axis and is substantially cylindrical or multi-sided for a major portion of its length and which extends downwardly from said top cover, past said air inlet openings, and along said primary axis, said airflow defining member being formed with a perforated sheet metal exterior and containing sound attenuating material; and
  airflow passageways extending from said air inlet openings towards said air outlet and each defined by at least one interior wall mounted in said duct structure, each airflow passageway bending substantially so that a bottom section thereof extends substantially parallel to said vertical first axis,
  wherein a substantial portion of said at least one interior wall is made of perforated sheet metal and sound attenuating material is contained in said at least one interior wall and is covered by said perforated sheet metal.

9. The combination of claim 8 wherein said gas turbine is elongate and has a central longitudinal axis about which blades of the gas turbine rotate during use of the gas turbine, and wherein said central longitudinal axis of the gas turbine is substantially horizontal and is substantially perpendicular to said vertical primary axis of said airflow defining member.

10. The combination of claim 9 wherein said upper duct section has at least four vertically extending sides, said air inlet openings are formed in all of said vertically extending sides, and said airflow defining member has a substantially downwardly and inwardly sloping upper section that extends downwardly from said top cover to a substantially cylindrical or multi-sided lower portion thereof.

11. An air duct silencing apparatus for use at an inlet of a stationary gas turbine, said silencing apparatus comprising:
  an inlet duct structure extending downwardly along a vertical first axis and including a duct section with a plurality of vertically extending sides and a top cover, a plurality of inlet openings being located on one of said vertically extending sides, which is an open side to a substantial extent, and an air outlet being formed at a bottom of said structure, said outlet being adapted for connection to an air intake of said gas turbine; and
  a plurality of curved airflow splitters separating said inlet openings and extending inwardly and downwardly from said inlet openings towards said air outlet, said airflow splitters each being formed with a perforated sheet metal exterior and containing sound attenuating material;
  wherein a plurality of airflow passageways are formed by and between said airflow splitters and extend from said inlet opening towards said air outlet, said airflow passageways bending substantially and an elongate bottom section of each passageway extending substantially parallel to said vertical first axis.

12. An air duct silencing apparatus according to claim 11 wherein there are at least three of said airflow splitters and there are two interior walls rigidly mounted on said duct structure on opposite sides of said airflow passageways, said interior walls being formed with perforated sheet metal and sound attenuating material being arranged between each of said interior walls and an adjacent exterior sidewall of said duct structure.

13. An air duct silencing apparatus according to claims 12 wherein said inlet openings are arranged substantially in a first plane extending an acute angle to a vertical plane defined by said one of the vertically extending sides, said first plane sloping upwardly and inwardly towards a center of said top cover.

14. An air duct silencing apparatus according to claim 12 wherein each of said interior walls has a substantially curved upper wall section and a planar lower wall section extending vertically downwardly from its corresponding upper wall section.

15. An air duct silencing apparatus according to claims 12 wherein said duct structure includes an air inlet plenum forming a duct elbow that bends approximately 90 degrees and wherein said air outlet is located at one end of said air inlet plenum.

16. A combination of a gas turbine for use at a stationary site and an air duct silencing apparatus according to claim 11 connected to an air intake of said gas turbine.

* * * * *